US010657071B2

(12) United States Patent
Durham et al.

(10) Patent No.: US 10,657,071 B2
(45) Date of Patent: May 19, 2020

(54) SYSTEM, APPARATUS AND METHOD FOR PAGE GRANULAR, SOFTWARE CONTROLLED MULTIPLE KEY MEMORY ENCRYPTION

(71) Applicant: Intel Corporation, Santa Clara, CA (US)

(72) Inventors: David M. Durham, Beaverton, OR (US); Siddhartha Chhabra, Portland, OR (US); Amy L. Santoni, Scottsdale, AZ (US); Gilbert Neiger, Portland, OR (US); Barry E. Huntley, Hillsboro, OR (US); Hormuzd M. Khosravi, Portland, OR (US); Baiju V. Patel, Portland, OR (US); Ravi L. Sahita, Portland, OR (US); Gideon Gerzon, Zichron Yaakov (IL); Ido Ouziel, Ein Carmel (IL); Ioannis T. Schoinas, Portland, OR (US); Rajesh M. Sankaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 15/714,217

(22) Filed: Sep. 25, 2017

(65) Prior Publication Data

US 2019/0095350 A1  Mar. 28, 2019

(51) Int. Cl.
*G06F 12/14* (2006.01)
*G06F 21/60* (2013.01)
(Continued)

(52) U.S. Cl.
CPC ........ *G06F 12/1408* (2013.01); *G06F 3/0623* (2013.01); *G06F 12/145* (2013.01);
(Continued)

(58) Field of Classification Search
CPC .. G06F 12/1408; G06F 12/145; G06F 3/0623; G06F 21/602; G06F 21/82;
(Continued)

(56) References Cited

U.S. PATENT DOCUMENTS 8,473,754 B2 * 6/2013 Jones ...................... G06F 21/72
380/277
8,606,997 B2 * 12/2013 Cypher ............... G06F 12/0811
711/117

(Continued)

FOREIGN PATENT DOCUMENTS

WO    WO-2015047285 A1 * 4/2015 ............. G06F 15/16

OTHER PUBLICATIONS

Jakub Szefer and Ruby B. Lee 'Architectural Support for Hypervisor-Secure Virtualization', ASPLOS'12, ACM, Mar. 3-7, 2012, London, England, UK, p. 437-449 (Year: 2012).*

(Continued)

*Primary Examiner* — Catherine Thiaw
(74) *Attorney, Agent, or Firm* — Trop, Pruner & Hu, P.C.

(57) ABSTRACT

In one embodiment, a cryptographic circuit is adapted to receive a data line including at least an encrypted portion from a memory in response to a read request having a memory address from a first agent, obtain a key identifier for a key of the first agent from the data line, obtain the key using the key identifier, decrypt the at least encrypted portion of the data line using the key and send decrypted data of the at least encrypted portion of the data line to the first agent. Other embodiments are described and claimed.

20 Claims, 9 Drawing Sheets

(51) Int. Cl.
*G06F 21/82* (2013.01)
*G06F 3/06* (2006.01)
*G06F 21/53* (2013.01)
*G06F 21/78* (2013.01)

(52) U.S. Cl.
CPC ............ *G06F 21/53* (2013.01); *G06F 21/602* (2013.01); *G06F 21/78* (2013.01); *G06F 21/82* (2013.01); *G06F 2212/1052* (2013.01); *G06F 2212/401* (2013.01); *G06F 2212/402* (2013.01)

(58) Field of Classification Search
CPC ....... G06F 2212/1052; G06F 2212/401; G06F 2212/402; G06F 21/53; G06F 21/78
See application file for complete search history.

(56) References Cited

U.S. PATENT DOCUMENTS

| | | | | |
|---|---|---|---|---|
| 8,621,241 | B1* | 12/2013 | Stephenson | G06F 12/14 713/189 |
| 2013/0191651 | A1* | 7/2013 | Muff | G06F 12/1027 713/193 |
| 2014/0208123 | A1* | 7/2014 | Roth | G06F 21/72 713/189 |
| 2016/0182223 | A1 | 6/2016 | Kishinevsky et al. | |
| 2017/0185529 | A1 | 6/2017 | Chhabra et al. | |
| 2017/0185532 | A1 | 6/2017 | Durham et al. | |
| 2017/0222981 | A1* | 8/2017 | Srivastav | H04L 63/0428 |
| 2018/0034792 | A1* | 2/2018 | Gupta | G06F 21/602 |
| 2018/0219675 | A1* | 8/2018 | Colgrove | G06F 21/79 |
| 2019/0081990 | A1* | 3/2019 | Roy | H04L 63/308 |

OTHER PUBLICATIONS

U.S. Appl. No. 15/444,771, filed Feb. 28, 2017, entitled "Secure Public Cloud With Protected Guest-Verified Host Control," by David M. Durham, et al.

U.S. Appl. No. 15/283,104, filed Sep. 30, 2016, entitled "Multi-Tenant Encryption for Storage Class Memory," by Hormuzd M. Khosravi, et al.

U.S. Appl. No. 15/390,359, filed Dec. 23, 2016, entitled "Techniques for Compression Memory Coloring," by David M. Durham.

* cited by examiner

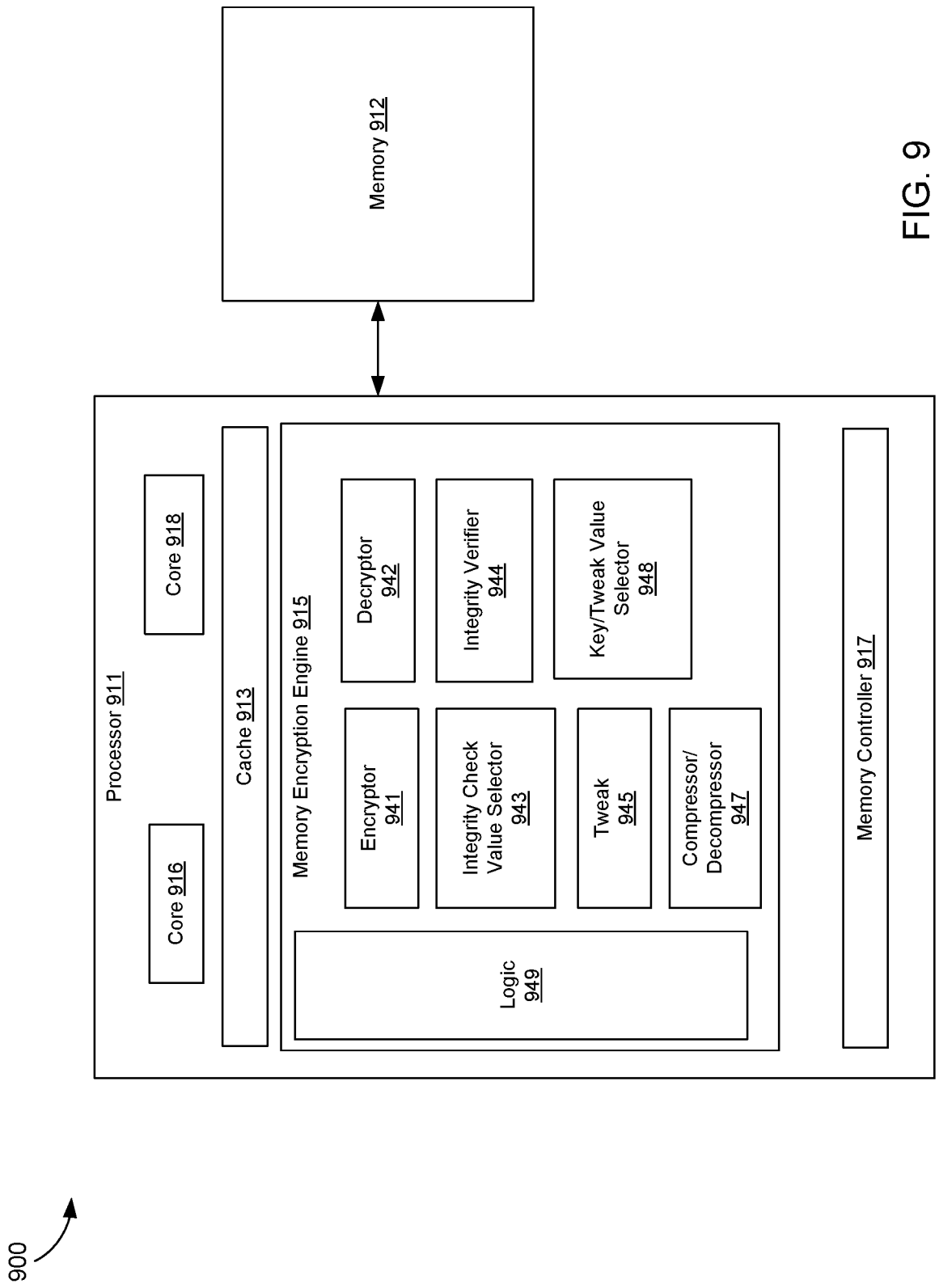

SYSTEM, APPARATUS AND METHOD FOR PAGE GRANULAR, SOFTWARE CONTROLLED MULTIPLE KEY MEMORY ENCRYPTION

TECHNICAL FIELD

Embodiments relate to memory encryption in a multiple tenant computing environment.

BACKGROUND

In multi-key memory encryption, a system memory is encrypted with more than one key to secure information and provide isolation to different entities seeking access to the memory. Currently, multi-key technology has a scalability problem, as complexities exist in identifying an appropriate key for use with a given portion of the memory. To this end, a key selector/identifier is used to identify the relevant key. One mechanism to communicate the key identifier is to utilize unused physical address bits (unused because not all system memory is populated). This approach has inherent scalability problems, as it steals memory address space that could otherwise be used for addressing memory. Adding additional address bits or other metadata consumes additional die area, and thus increases cost and decreases performance. As more traditional enterprise workloads move to cloud computing environments, data protection/encryption is becoming a foundational requirement, from cloud service providers (CSPs) to hardware and system vendors. However, supporting a key per tenant of a CSP to help achieve cryptographic isolation between different CSP customers comes at a high cost of complexity and limits scalability.

BRIEF DESCRIPTION OF THE DRAWINGS

FIG. 9 is a block diagram of an apparatus that can be used to implement an embodiment of the invention.

DETAILED DESCRIPTION

Figure 1:
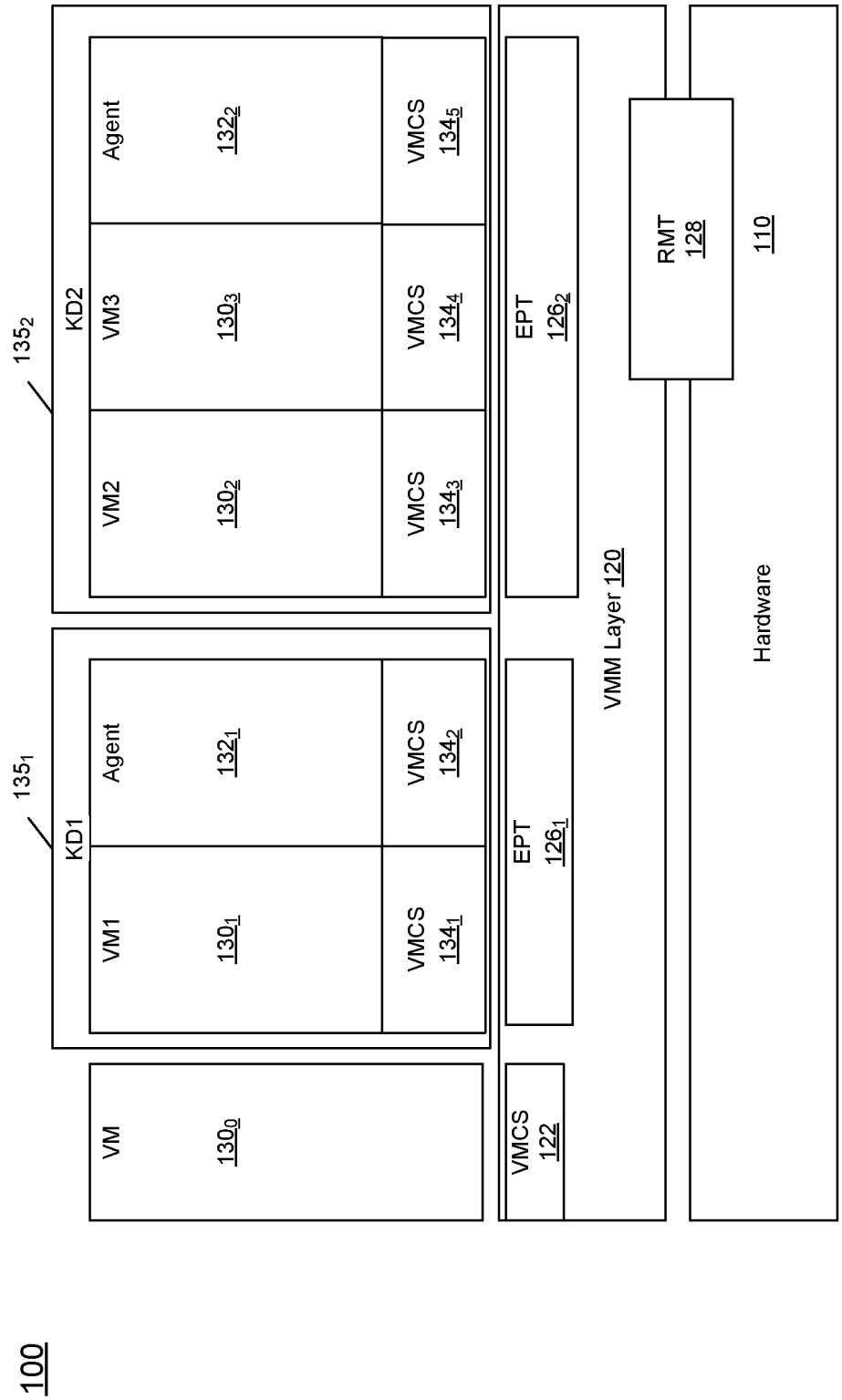
FIG. 1 a block diagram of a multi-tenant computing environment in accordance with an embodiment of the present invention.

In various embodiments, techniques are used to efficiently assign keys for use in encrypting/decrypting data stored in a memory to memory pages in a cache and resource-effective manner. More specifically, embodiments may use a combination of a page-to-key identifier lookup table and an encrypted compression technique to include a key identifier inline within data being accessed. In this way, a key lookup technique occurs as efficiently as directly identifying keys using physical memory address bits, without the deleterious effects of reducing an addressable address space with a direct identification technique. Furthermore, embodiments enable memory access control to be performed by software, greatly simplifying processor architecture for usages such as virtual machine (VM) isolation, storage and cloud security.

Performing table lookups for keys and/or key identifiers (KeyIDs) may be a performance concern, as it is possible that two memory accesses may occur per a given memory request (one to fetch a data line and the other to fetch key/KeyID mapping information). In embodiments, compression enables the KeyID to be directly embedded in data lines in memory. Most data lines (e.g., over 95% of cache lines) may be sufficiently compressible for small key identifiers. This compression, when combined with key/KeyID caching, translates to over 98% of cache lines not performing any additional memory reads for obtaining key mapping information.

In embodiments, a cryptographic table structure is defined that allows software (such as a given virtual machine (or other agent owning/knowing a key)) to directly assign memory pages to keys. Stated another way, user level or guest software such as a given VM or other software entity, e.g., of a tenant of a multi-tenant computing environment, may itself generate a key for use in encryption/decryption of memory pages allocated to it by a supervisor such as a virtual machine monitor (VMM) or other hypervisor. Further, entries for the page-to-key identifier lookup table may be encrypted by the software itself using this generated key. In turn, the software may provide such entries to appropriate hardware for inclusion in the lookup table. In this way, a memory execution circuit of a processor such as a multi-key total memory encryption (MKTME) execution circuit can support an unlimited number of keys, without consuming address bits or any additional cache resources. Instead the MKTME execution circuit utilizes this cryptographic memory lookup table, where each entry assigns a key to a memory page. Furthermore, memory (cache line) compression may enable key identifier information to fit into the stored data lines such that no table lookups occur on memory reads for these lines, avoiding inefficient table lookups on this latency critical path. Embodiments thus provide an unlimited number of keys without increasing cache die area, without impacting available memory capacity and without impacting performance.

In embodiments, a key table stored in memory and access controlled by the MKTME execution circuit may store encrypted (wrapped) keys. These are the individual keys provided by VMs or other agents allocated a given memory portion, which may be wrapped with a secret key only known to the hardware platform (e.g., derived from a fuse key or physically unclonable function (PUF)) prior to storage in the key table. As the MKTME execution circuit retrieves keys from this table, it may cache individual keys, assuming they will be reused for subsequent memory accesses to avoid memory latency for read operations. In embodiments, this key cache is logically internal to MKTME execution circuit, and is exclusively accessed by the MKTME execution circuit. Some embodiments may have sufficient on-chip memory such that the whole key table may be stored within the MKTME execution circuit. Alternative embodiments may derive the key from the KeyID, forgoing the need for key table. For example, the KeyID can be encrypted with the secret key known only to MKTMW execution circuit, and the resulting ciphertext is used as the derived key. Other methods or standards for key derivation may also be employed. In an embodiment, this key table is indexed by the KeyID of the corresponding key in the indexed entry and version. If a new key is added to the table or an existing key entry modified, caches may be flushed and all processor TLB state cleared.

In typical virtualized environments, a host VMM/hypervisor (referred to as a "VMM" or "host VMM" hereinafter) has full control over the guest VMs that the host VMM manages. The host VMM can read/write guest VM memory, modify guest VM control flow (single step, rewind, repeat, debug), read/modify guest VM register state, read/modify guest VM control structures, and so on. However, this complete control over the execution of the guest VM may pose a security risk that the host VMM is compromised and may modify the guest VM such that a customer's secrets and data residing within the guest VM are exposed.

In a typical virtualized environment, with a switch from one virtual machine to another, data structures that pertain to the execution state of the virtual machine are modified by the VMM. These data structures may include a virtual machine control structure (VMCS) and memory mappings (e.g., page tables and extended page tables (EPTs)). The VMCS is a data structure in memory that exists once for each logical processor for each guest VM, while the guest VM is managed by the host VMM. In a multi-processor system, each processor simultaneously executing the guest VM may have a unique VMCS. With every change of the execution context between different VMs, the VMCS is restored for the currently-executing VM, defining the state of the VM's virtual processor. When the execution context switches (VMExits) from a guest VM back to the host VMM, the same VMCS structure is used to restore the host's processor state from the host state area of the VMCS.

The operating system for a guest VM may form its own memory mappings between virtual and guest physical memory addresses (GPAs) using its own page tables. The VMM then uses extended page tables (EPTs) to map GPAs to the actual physical addresses (PAs) used by hardware to access physical memory. However, these VMM controlled memory mappings can be used by the VMM to compromise a guest VM.

Embodiments enable a host VMM to operate "blindly," without the ability to access data within a guest VM or the ability to access directly control structures that control execution flow of the guest VM. Guest VMs execute within a protected region of memory that even the host VMM cannot access. In one embodiment, the protected region of memory in which a guest VM executes is implemented as a key domain, which is encrypted with a consumer-provided key domain key (hereafter "key").

In some embodiments, Intel®'s Virtualization Technology (VT) and Trusted Execution Technology (TXT) are used in conjunction with a protected memory range inaccessible by the VMM (but originally accessible to TXT), and/or memory encryption technology such as Intel®'s Total Memory Encryption (TME), TME with Integrity (TMEi) or Memory Encryption Engine (MEE), or another memory execution circuit as described herein. Embodiments thus may remove a public cloud services provider's VMM/hypervisor code from the Trusted Code Base (TCB) of the guest virtual machine (VM)/workload. These techniques protect the consumer's workload from access by the host VMM, yet enable the host VMM to retain full control of the platform and manage guest virtual machines running on the platform. Using memory encryption technology in accordance with an embodiment may protect guest VM workloads from physical attacks and prevent the host VMM from accessing the VM's (encrypted) memory. Neither the cloud service provider's software, administrators, nor anyone with physical access to the cloud service provider's servers can access or modify protected guest VMs.

Referring now to FIG. 1, a block diagram of a multi-tenant computing environment 100 is shown. Running on server hardware 110 (which may include processing resources such as one or more multicore processors, memory, storage, network interface circuitry and so forth) is a VMM layer 120. VMM layer 120 is computer software or firmware that creates and runs virtual machines (VMs), such as VM1 $130_1$, VM2 $130_2$, and VM3 $130_3$, on server hardware 110. Each of VMs VM1 $130_1$, VM2 $130_2$, and VM3 $130_3$ is shown as standalone block in FIG. 1, representing different VMs all under the control of a common VMM layer 120. VMM layer 120 provides access to server resources, such as server hardware 110, to the VMs that the VMM controls.

VMM layer 120 uses data structures such as a VMCS 122 and extended page tables (EPTs) $126_{1,2}$ to control execution of VMs. VMCS 122 is a data structure in memory that exists once for certain VMs while managed by VMM 120. With every change of the execution context between these VMs, VMCS 122 is restored for the current VM, defining the state of the VM's virtual processor. EPTs $126_{1,2}$ are used to launch a VM's virtual processor with privileges as an "unrestricted guest."

VMM layer 120 software or firmware is provided by the cloud services provider and is part of the TCB for VM $130_0$, which is a trusting VM. The inclusion of the at least a portion of VMM layer 120 in the TCB forecloses VM 130 from seeing, measuring, or trusting the VMM that controls that particular VM. The cloud services provider can change VMM layer 120 at any time without this VM owner's knowledge. Furthermore, no cryptographic separation exists between such trusting VMs. If the VMM has been compromised, a corrupt VM can access private data in a second VM via the compromised VMM that nevertheless is trusted by the second VM.

In embodiments that provide software-based cryptographic isolation of memory on a page granularity, VMs $130_{1-3}$ are cryptographically isolated from the VMM/other VMs using different key domains $135_1$, $135_2$. For these VMs, corresponding VMCSs $134_{1-5}$ may be isolated within a given key domain 135. VMCSs $134_{1-5}$ are of the key domains themselves so that a determination as to whether a key is owned by the corresponding VM may be based on the VMCS's address. A guest agent $132_2$, $132_3$, provided by the tenant to protect the tenant's workload, is responsible for producing ciphertext for control structures and memory mappings. A correctly decrypting VMCS 134 may then be used to launch VM 130 within a given key domain. In this way, VMs of different key domains 135 are isolated from each other.

As further illustrated in FIG. 1, a reverse mapping table (RMT) 128 is used by a processor of hardware 110 (e.g., a page miss handler PMH)), to determine if a host physical memory address (HPA) and guest physical address memory (GPA) mapping is assigned to the correct owning key domain. Each entry in RMT 128 mapping one physical address to one guest physical address is encrypted with the key domain key. In this way, the party owning the key domain key (e.g., the guest agent) authorizes that a memory mapping is correct for this unique key, encrypting the verified entries with this key. RMT 128 may be combined with a page-to-key (P2K) mapping table maintained by a memory execution circuit. In embodiments that utilize and combine the P2K and a processor reverse mapping table (RMT) or memory ownership table (MOT) or similar structure, the MKTME execution circuit may only decrypt a memory page after the processor first accesses the associated table entry, MKTME caching and using the combined P2K entry as long as a processor also caches the associated entry (e.g., in processor cache(s) or TLBs). In some embodiments, a processor may signal to the MKTME execution circuit when it is done with a RMT entry by writing the entry back to memory causing the MKTME execution circuit to release its corresponding cached P2K entry, thus ensuring the processor and the MKTME execution circuit are synchronized and using the same KeyID for a memory page.

As an example, a secure domain 135 may be a customer workload (which can include an operating system (OS) alone along with other ring-3 applications running on top of the OS, or a VM running on top of a VMM along with other ring-3 applications). Each secure domain is cryptographically isolated in memory using at least the separate key for encrypting the code and data associated with the domain. In embodiments, the VMM may use page tables to assign one or more key domains to a VM. This assignment provides enhanced cryptographic isolation in a multi-tenant computing environment, creation of a shared encrypted memory space between two VMs, and/or supports different volume encryption domains for non-volatile memory usages (such as application direct storage class memory (SCM)). Privileged software such as ring-0 software can assign these key domains by specifying a key identifier. The VMM has ultimate control over these domains via page table mappings that control the physical address space. For a bare-metal OS or the VMM itself, the page tables can be used to determine the proper key domain. For direct physical mappings (e.g., virtual machine extension (VMX) pointers, CR3 with no CDT) the behavior is the same, and software can select a proper KeyID.

In embodiments, the P2K table (memory range) is access controlled by a memory execution circuit such as the MKTME execution circuit. As with the RMT, each entry in this table is encrypted using a corresponding key domain key (generally "key" herein), demonstrating that the owner of the key acknowledges ownership of the physical memory page. The MKTME execution circuit may use this key to encrypt (on memory writes) or decrypt (on memory reads) a cache line belonging to the associated memory page. Having such a table alleviates the need for identifying keys using additional address bits, enabling a greater address space to be available. In an embodiment, each P2K entry has a non-encrypted portion, the KeyID (located at a page address-based index). Each entry also has an encrypted portion including an address and, in embodiments, an integrity check value (such as a fixed value) and/or version number and possibly other metadata.

When a memory read/write occurs, the MKTME execution circuit first accesses the P2K table and lookups the KeyID for the memory address (at page granularity). In one embodiment, each KeyID may be associated with three modes: encryption using a specified key (where this key is generated by a given VM or other agent); do not encrypt at all (memory will be plaintext); and encrypt using a key of the MKTME execution circuit. Then the MKTME execution circuit obtains the key from a key table and uses it to decrypt the encrypted portion of the entry. If the entry address matches the memory address (page granularity) of the memory read/write, then the key mapping is valid and the MKTME execution circuit uses the key to decrypt/encrypt the memory/cache line. If an entry is read from the table (e.g., due to a PMH walk verifying a HPA-to-GPA mapping is correct), the encrypted portion of the entry is likewise decrypted by the MKTME execution circuit and returned to a requester, e.g., a given VM or other agent via a cache memory hierarchy of the processor. Thus, a correctly decrypted entry will verify the HPA-to-GPA mapping.

On a P2K table update/write, the processor (or MKTME execution circuit on observing a write to a protected P2K memory range) may be configured to first ensure (or observe) that a page granular cache flush (of the referenced memory page) is completed before the memory page is reassigned with a new P2K entry. This ensures that a processor does not contain stale plaintext information for a page that may be accessed by the wrong software entity. Once the page flush completes, the updated P2K entry can be installed in memory and used to encrypt/decrypt the associated memory page. In embodiments, a cross-core translation lookaside buffer (TLB) shootdown also may occur, at least, for the remapped HPA. If a page is remapped to a new KeyID, memory may also need to be cleared for the page when compression is used to ensure that the previous KeyID is not reused.

Figure 2:
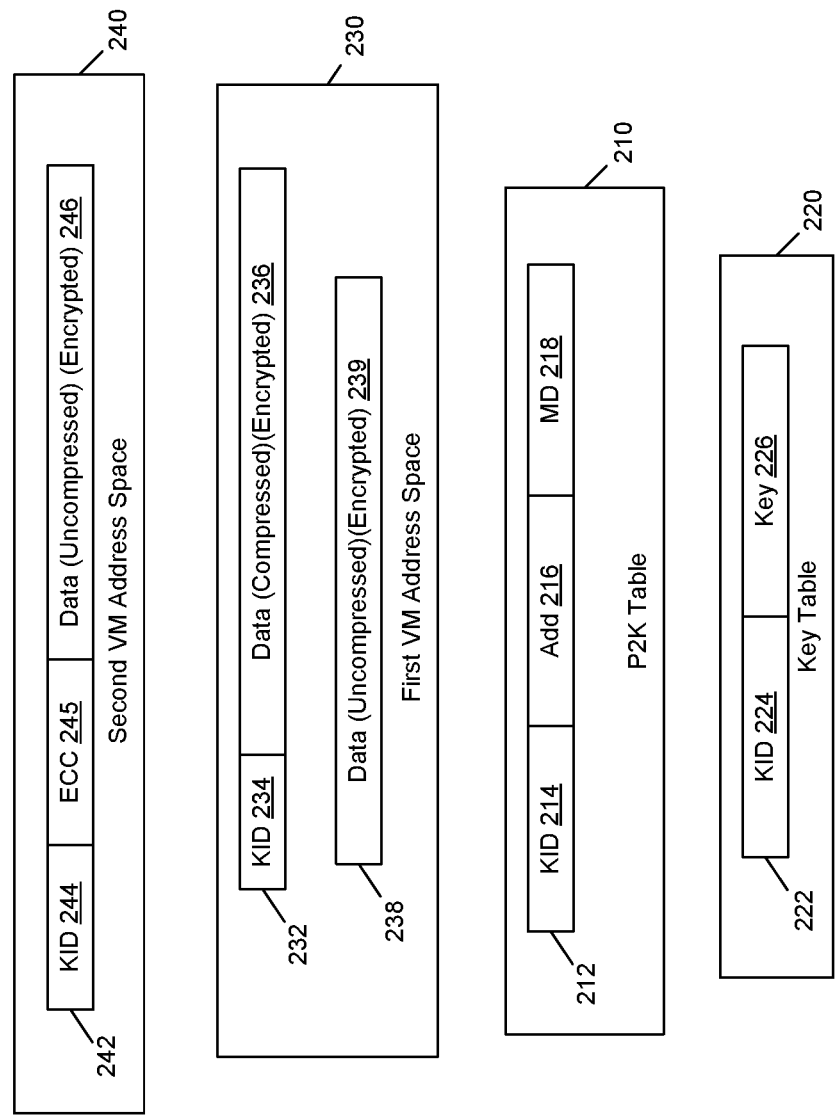
FIG. 2 is a block diagram of a memory in accordance with an embodiment of the present invention.

Referring now to FIG. 2, shown is a block diagram of a memory in accordance with an embodiment of the present invention. More specifically, memory 200 shown in FIG. 2 may be a system memory for a given computing environment such as a multi-tenant computing environment. In embodiments herein, system 200 may be implemented using dynamic random access memory (DRAM) such as a set of dual in-line memory modules (DIMMs) that may be implemented in one or more server computer systems of the multi-tenant computing environment.

To leverage multi-key encryption within this environment so that each of multiple virtual machines (potentially each of which may be associated with a different customer or tenant of the multi-tenant computing environment) can have one or more keys exclusive to that virtual machine so that the virtual machine may control access to the memory pages allocated to it by, e.g., a VMM or other hypervisor.

With reference to FIG. 2, various tables may be present to enable mapping of these keys and corresponding key identifiers with the different pages of the memory that are allocated to one or more VMs or other agents that execute within the computing environment. Specifically, memory 200 may store a page-to-key (P2K) table 210. P2K table 210 includes a plurality of entries 212, a representative one of which is shown at a high level in FIG. 2. In embodiments, each entry 212 may be generated by a given VM or other agent and may include a key identifier (KID, also referred to herein as a "KeyID") field 214 to store a KID, itself generated by the VM to provide an association between this key identifier and a corresponding key. Note that in embodiments, the VMM may choose KeyIDs. In addition, each entry 212 further includes an address 216 portion to store an address, which corresponds to a memory page within the memory that is to be encrypted using the key identified by the KID. In addition, in embodiments each entry 212 may further include metadata portion 218 to store metadata. Although the scope of the present invention is not limited in this regard, in embodiments this metadata information may include permission information, sharing information version information and so forth.

As discussed, a given VM may generate a given entry 212. In addition, the VM may encrypt the entry (namely address portion 216 and metadata portion 218) with the key, which is generated by the VM itself to thus manage its pages. Note however that KID field 214 remains unencrypted so that lookup operations may occur and further where the KID stored in a given entry 212 may be used to access the corresponding key to enable decryption of the given entry 212. After generation of a given entry 212, the VM may communicate it to a memory execution circuit, VMM or other supervisor entity for storage within P2K table 210.

In an embodiment, P2K table 210 is indexed by the physical page address being looked up. As described, the KeyID stored in each P2K table entry is not encrypted to enable identification of the correct key to use. When the other data (including the physical page address) are decrypted, a comparison is performed between the decrypted physical page address from the entry and the physical page address used to lookup the entry. A match confirms that whoever created that P2K entry also knew the key, and encrypted the correct corresponding physical page address to this identity a valid memory assignment.

For example, assume P2K table 210 is located as an array of contiguous physical memory such as beginning at physical address 0 (no offset) and each table entry is 64 bytes (16 bytes for unencrypted KeyID to support 64K KeyIDs, remaining bytes for encrypted addresses, etc., and recognizing that this example presents an unnecessarily large entry size that is sized to cache line width). Continuing with this example, 1024 4 KB pages cover 4 MB of memory, resulting in a table size of 1024×64B (16 4 KB pages). Each table entry is indexed by the accessed physical page address, so the first page corresponds to the first entry in the table, and the second page indexes 64 bytes after the first entry and so on. Since there are 64 64B cache lines within a 4 KB page, the least significant 6 bits from the physical cache line address may be ignored to determine the page's physical address (which page), subtract 16 (this P2K table size in pages, an offset) to identify the correct P2K entry location in the table (its cache line address).

In another embodiment, P2K table 210 may implement 2 bytes per 4 KB page. As such, for a 4 TB platform memory, P2K table 210 consumes 2 GB of contiguous physical memory. This implementation allows a platform to scale to 4 PB (52 bits) of physically addressable memory while providing multi-tenant memory encryption. System software may be configured to determine the address and size of this table based on a configuration register.

Still with reference to FIG. 2, a key table 220 also is stored in memory 200. Key table 220 includes a plurality of entries 222, a representative one of which is shown in FIG. 2. As seen, each entry 222 includes a KID 224 and a corresponding key 226. In an embodiment, processor hardware may generate entries 222 for key table 220. Furthermore in embodiments, at least the key portion of each entry may be encrypted. For example, the memory execution circuit may use a single permanent key of its own to encrypt these keys prior to storage of entries 222 within key table 220 of memory 200. As one example, entries in table 220 may be created by hardware (e.g., processor microcode, secure processor mode, a security processor, or embedded system that is a trusted part of the hardware). The VMM may execute a CreateKD instruction where the input key is encrypted with the hardware's public key (so the VMM does not know the key), and the VMM chooses the KeyID for the key. As such, hardware encrypts table 220 using a secret hardware key that the VMM does not know, to protect the table from both the VMM and a physical attacker that can modify external memory.

As will be described further herein, during memory encryption/decryption operations, a KID, which may be obtained in different manners as described herein, is used to obtain the corresponding key for a given page to be used for the encryption/decryption. Note further that at least portions of both P2K table 210 and key table 220 may be cached within a processor so that the memory latency of obtaining this information can be reduced. Furthermore, as described herein in embodiments data lines themselves may include KIDs such that decryption operations for read requests can avoid the need to access P2K entries whatsoever, further reducing latency.

With further reference to FIG. 2, data stored within memory 200 may be encrypted using the keys described herein to provide protection of individual VM's data so that it is protected from unauthorized access by other VMs (or other agents) accessing memory within a multi-tenant computing environment. As illustrated, a first virtual memory address space 230 may be associated with a first VM and can include a plurality of different pages. In the embodiment shown, a first data line 232 (which may be of a first page of memory allocated to this first VM) includes a KID 234 and a data portion 236 which may be data of the first VM that is in a compressed and encrypted state. Namely, this data has been compressed according to a given compression technique (metadata associated with the compression technique may be included within data portion 236). Furthermore, this compressed data has been encrypted with the key corresponding to KID 234. By providing KID 234 within data line 232 itself, reduced latency for performing read operations (including corresponding decryption of data line 232) may be realized.

In some cases a given embodiment may not provide for compression (or a particular data line may not be compressible). One example of such case is shown at data line 238 (which may be a data line of another memory page allocated to this first VM). As seen, data line 238 includes uncompressed data 239 (which may be encrypted). Because of the uncompressability of this data, note that a KID is not stored within data line 238. As such, in addition to a read access to obtain this data line, an additional read access to an entry within P2K table 210 (or from a cached location) to determine the KID, to thereafter enable access to the corresponding key.

In another implementation, KeyID information can be inserted into a field associated with error correction code (ECC) information. As illustrated, a second virtual memory address space 240 may be associated with a second VM and can include a plurality of different pages. In the embodiment shown, a data line 242 (which may be of a page of memory allocated to this second VM) includes a KID 244, ECC information 245 and a data portion 246 which may be data of the second VM that is in an uncompressed (or in other cases compressed) and encrypted state. By providing KID 244 within data line 242 itself (or associated with ECC information for the data line, in cases where this ECC information is separately stored), reduced latency for performing read operations (including corresponding decryption of data line 242) may be realized. Understand while shown at this high level in the embodiment of FIG. 2, many variations and alternatives are possible.

As discussed above, one or more memory compression techniques can be used to allow the key identifier to fit within each data line. In this case, a returned data line from memory in response to a read request already includes the key identifier in the line being read. The identified key may then be obtained and used to decrypt the remainder of the data line. Although the scope of the present invention is not limited in this regard, in one embodiment an encryption technique may implement a block cipher mode of operation, such as a XEX-based tweak-code book mode with cipher text stealing (XTS) technique, where the physical address is used as a tweak. While XTS mode is possible, other embodiments may apply another block cipher-based cryptographic technique such as Advanced Encryption Standard in Electronic Code Book (ECB) or another cryptographic modes including LRW, XEX or so forth.

Figure 3:
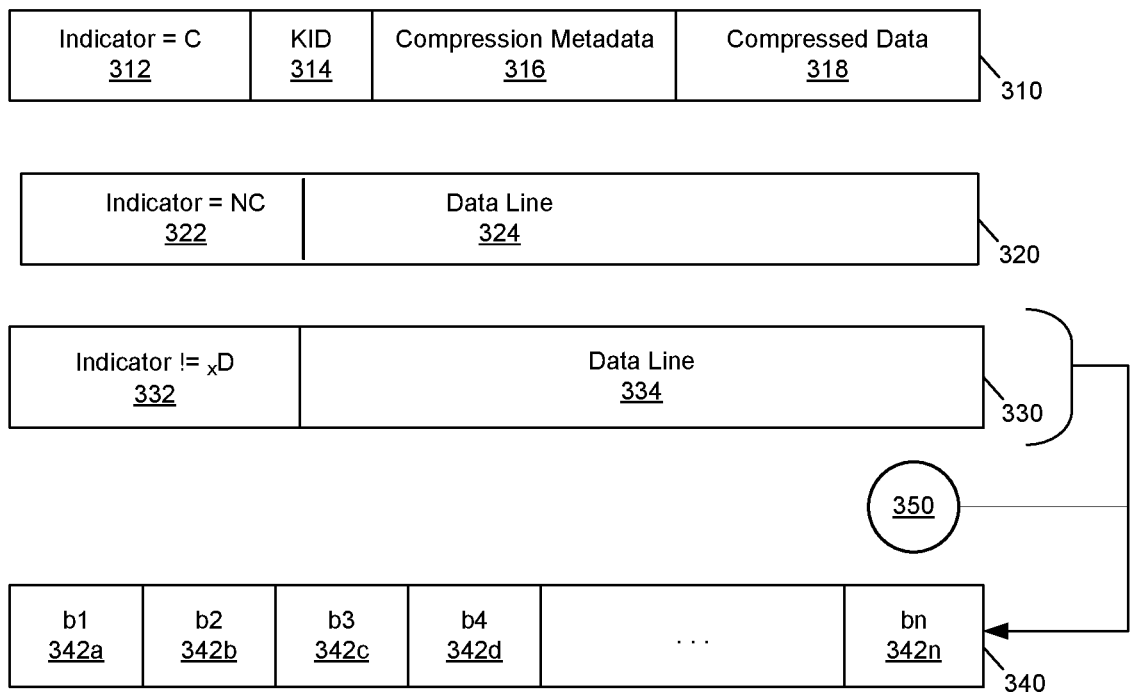
FIG. 3 is a representation of encryption/compression of data lines in accordance with an embodiment.

Referring now to FIG. 3, shown are example data line formats providing compression in accordance with an embodiment. As illustrated in FIG. 3, a first data line 310 includes a compression indicator 312 (of a set state (e.g., C) (to indicate that the corresponding data line is compressed). Further as described herein by way of such compression, a KID 314 may be stored within data line 310. The remainder of data line 310 is compressed (and encrypted). More specifically, as illustrated in data line 310, compression metadata 316 and compressed data 318 may be present. Instead if data of a given data line is non-compressible, as illustrated in data line 320, a compression indicator 322 is of a reset state (e.g., NC) to indicate that data line 320 is uncompressed, and as such, uncompressed data 324 is stored in data line 320.

If a data line is non-compressible and the non-compressible data conflicts with the compression indicator, a conflict indicator is used (e.g., xD 332) as in data line 330, incurring an additional memory lookup to determine a replacement value from a conflict table 340. All other values indicate uncompressed. In this embodiment, the indicator value can be one bit (e.g., 1 indicates compressed, 0 indicates not compressed). Then values 342 indicate the original bit of data that indicator value 332 replaced. That is, where a line does not compress, the indicator 0 replaced the first bit of the data line to indicate the data was not compressed, and the original data bit value the indicator replaced was moved to compression table value 342. When the indicator value is larger (e.g., 0xD (4 bits)), then value 342 indicates whether the original 4 bits of the data was the value 0xC (in which case value 342 is 0), or 0xD (in which case value 342 is 1), since there are only two possibilities of what the replacement value should be. Since in an embodiment there are only 64 64 byte cache lines per 4K byte page, the compression table can be merged with the P2K table, where each entry of the P2K table contains all 64 bit values corresponding to the page (64 bits per P2K table entry), as well as specifying the KeyID for the page. In other words, there is a sufficient place in the P2K table entry to hold the 64 compression indicator bits for the corresponding page.

Note that the compression indicator and KeyID remain outside the encrypted/compressed data region. Only the compression metadata and compressed data are therefore encrypted. A block cipher can be wrapped around to doubly encrypt a portion of a previous block when the KeyID and indicator values comprise a sub-block (a region less than the cipher's block size).

Figure 4:
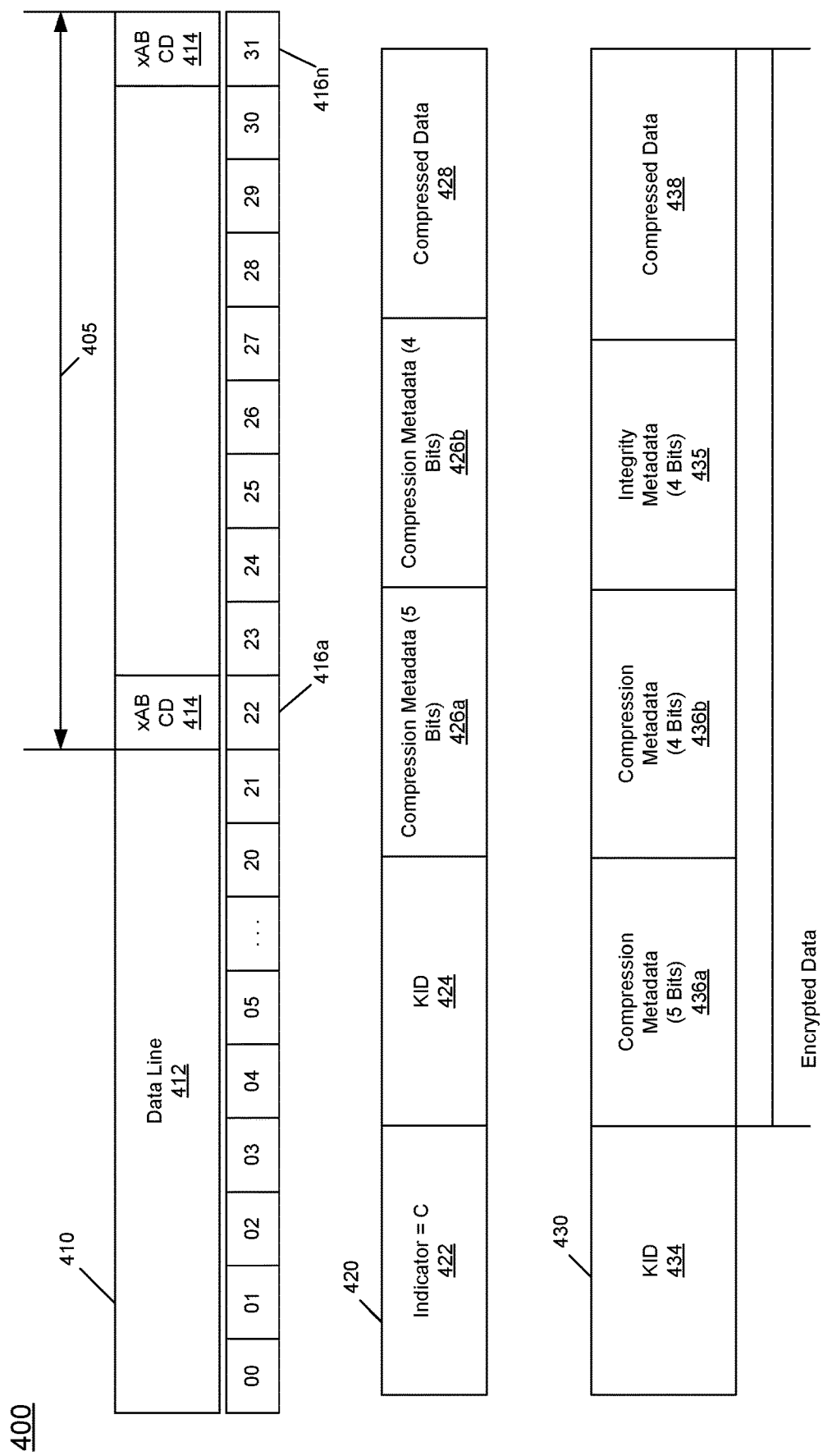
FIG. 4 are examples of compression data formats that may be used in accordance with an embodiment.

Referring now to FIG. 4, shown are examples of compression data formats that may be used in accordance with an embodiment. As illustrated, a data element 410 may include a data line 412 with repeating words 414 on a 16-bit boundary 405 (for example, a 16-bit sequence repeating on a 16-bit boundary). In an embodiment, this repeated word may be concatenated to provide space for compression metadata.

As illustrated, data element 420 may include a compression indicator 422 having, e.g., a set value to indicate that this data element includes compressed data. As a result, data element 420 may store a KID 424, compression metadata 426a and 426a (for example, 9 bits of compression data in a five bit unit 426a and a four bit unit 426b, where the first unit indicates the location of the first repeating word and the second unit indicates the distance from the first to second repeating word, where the second unit/distance indicator may also wrap around back to the beginning of the cache line to identify the second repeated word location. Still further, data element further includes compressed data 428. Note that in these examples, when compression is combined with encryption, compression is performed prior to encryption and in turn, decompression occurs after decryption upon read operations.

Finally as further illustrated in FIG. 4, an encrypted data line 430 (without an explicit compression indicator) may include an unencrypted portion in which a KID 434 is stored. In turn the remainder of data line 430 may store encrypted data, including, e.g., compression metadata 436a, 436b, integrity metadata 435, and compressed data 438. Note that integrity metadata 435 may be used to verify that the data was not corrupted. If table entries do not decrypt properly (e.g., wrong key), the HPA address will be wrong for the index and/or the version number will not match the current version (matching the corresponding KeyID table entry version), providing an implicit integrity check. In turn, a PMH verifies the mapping and permissions.

Figure 5:
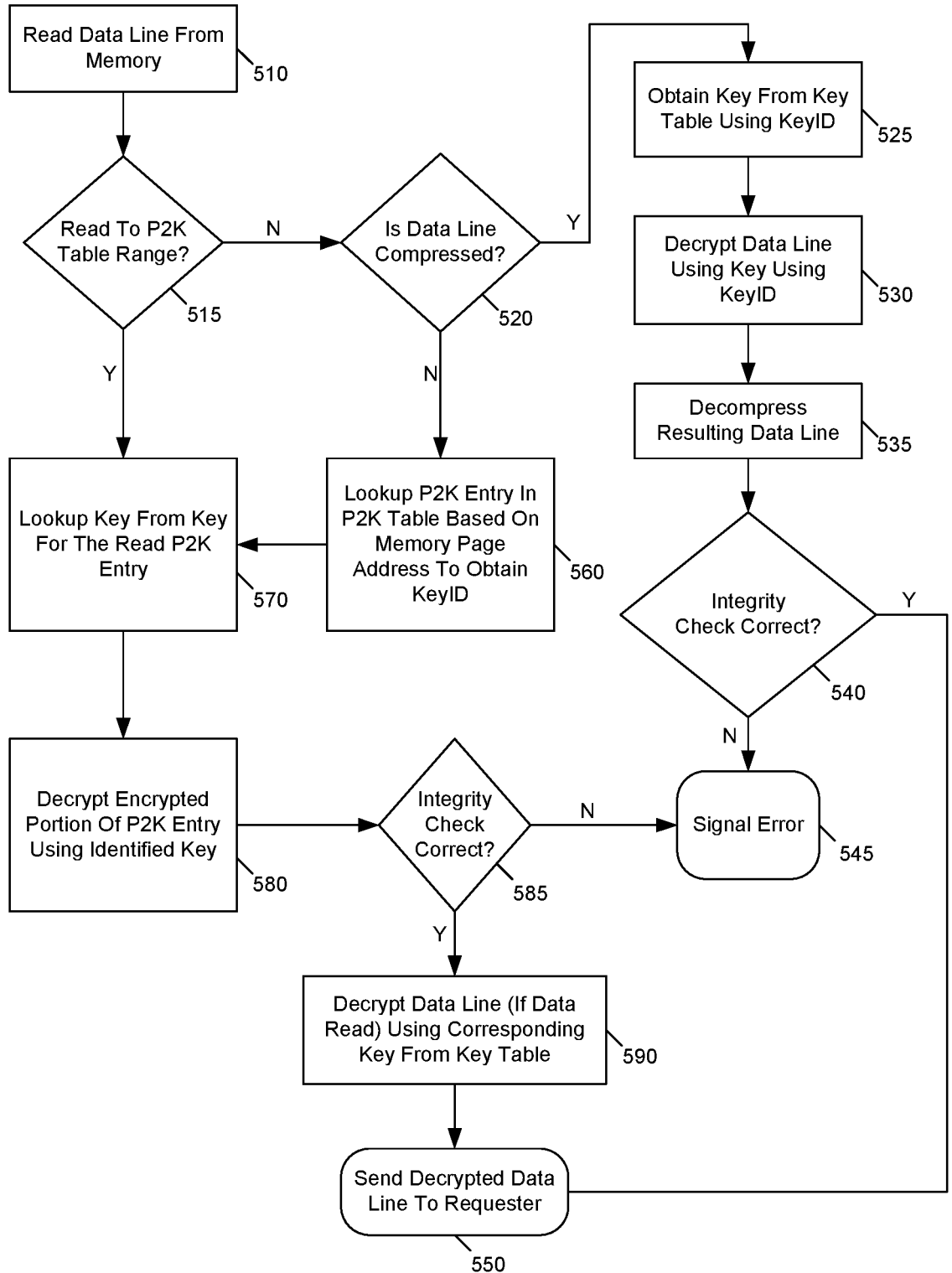
FIG. 5 is a flow diagram of a method in accordance with an embodiment of the present invention.

Referring now to FIG. 5, shown is a flow diagram of a method in accordance with an embodiment of the present invention. More specifically, method 500 of FIG. 5 is a method for performing read operations on encrypted data stored in a memory having encryption in a multi-key architecture as described herein. In embodiments, method 500 may be performed by a memory execution circuit such as a memory encryption engine of a secure computing domain. As such, method 500 may be performed by hardware circuitry, software, firmware and/or combinations thereof. As illustrated, method 500 begins by reading a data line from the memory (block 510). This data line may be encrypted with a given key of multiple keys, e.g., each associated with a given VM.

Note that in the embodiment shown, this read operation is in response to a read request for data at a given memory address of the memory, as received in memory execution circuitry (e.g., after the read request misses in a cache hierarchy of the processor). As such, this memory request is received with a physical address within the memory at which the requested data is located.

Next, control passes to diamond 515 to determine whether this read request is to a location within the P2K table itself (such as a read in advance of an update to the table). If not, control next passes to diamond 520 to determine whether the data line is compressed. In an embodiment, a compression indicator of the data line may be accessed to determine whether the line is compressed. If it is determined that the line is compressed, control passes to block 525 where a key can be obtained from a key table using a KID that corresponds to this key. Note that when a given data line is compressed, an unencrypted (and uncompressed) portion of the data line may include this key identifier. As such, no lookup access to the P2K table occurs for this read request, thereby reducing latency for this critical read path. Note that in some cases, instead of accessing the key table directly, a given entry from the key table may be cached so that it can be accessed more readily, further reducing latency.

Still with reference to FIG. 5, control next passes to block 530 where the data line is decrypted using this key to thus obtain unencrypted data. Thereafter at block 535 the data line is decompressed. In an embodiment, this decompression may be performed using compression metadata present within the data line (stored in the decrypted data portion).

Still with reference to FIG. 5, control next passes to optional diamond 540 where it is determined whether an integrity check is correct. As one example, the uncompressed data portion may include integrity metadata. As one such example, this integrity metadata may correspond to a secure hash algorithm (such as SHA2 or SHA3) value, or a MAC (message authentication code) computed over the data, and can be checked to confirm integrity. If integrity is not confirmed by way of a correct check here, control passes to block 545 where an error may be signaled for this data read. Otherwise assuming a correct integrity check, control passes to block 550 where the decrypted data line is sent to a requester. For example, this data line requested by, e.g., a given VM, can be sent to a cache memory hierarchy of the processor for provision to one or more cores on which the VM executes.

Still with reference to FIG. 5, if instead at diamond 520 it is determined that the data line is not compressed, the KID is not present in the data line and thus a P2K table access occurs. More specifically as shown at block 560, this P2K table lookup may be performed to find a matching entry within the P2K table based on a memory page address, namely the page address that includes the requested memory location (as obtained from the memory address of the read request itself). Thus this table lookup is performed to obtain the KID. Note in some cases, the P2K entry may be cached so that the latency of the table access is avoided.

Still as to FIG. 5, control next passes to block 570 where the key table itself is looked up using the KID to obtain the indicated key. At block 580, the encrypted portion of the P2K entry (namely the page address portion as possibly metadata) is decrypted using the identified key. With this information, control passes to diamond 585 where an integrity check may be performed. Specifically, this decrypted page address can be compared to the page address of the memory request itself to confirm that these physical addresses match. If not, control passes to block 545, discussed above to signal an error. Otherwise, assuming a valid integrity check control passes to block 590 where the data line is decrypted (in the case of an uncompressed data read operation) using this key to obtain decrypted data, which is then sent to the requester, at block 550.

Note that in the case of a read to the P2K table itself (as determined at diamond 515), control directly passes to block 570 for the key table lookup, and then control proceeds as discussed above. Understand while shown at this high level in the embodiment of FIG. 5, many variations and alternatives are possible.

Figure 6:
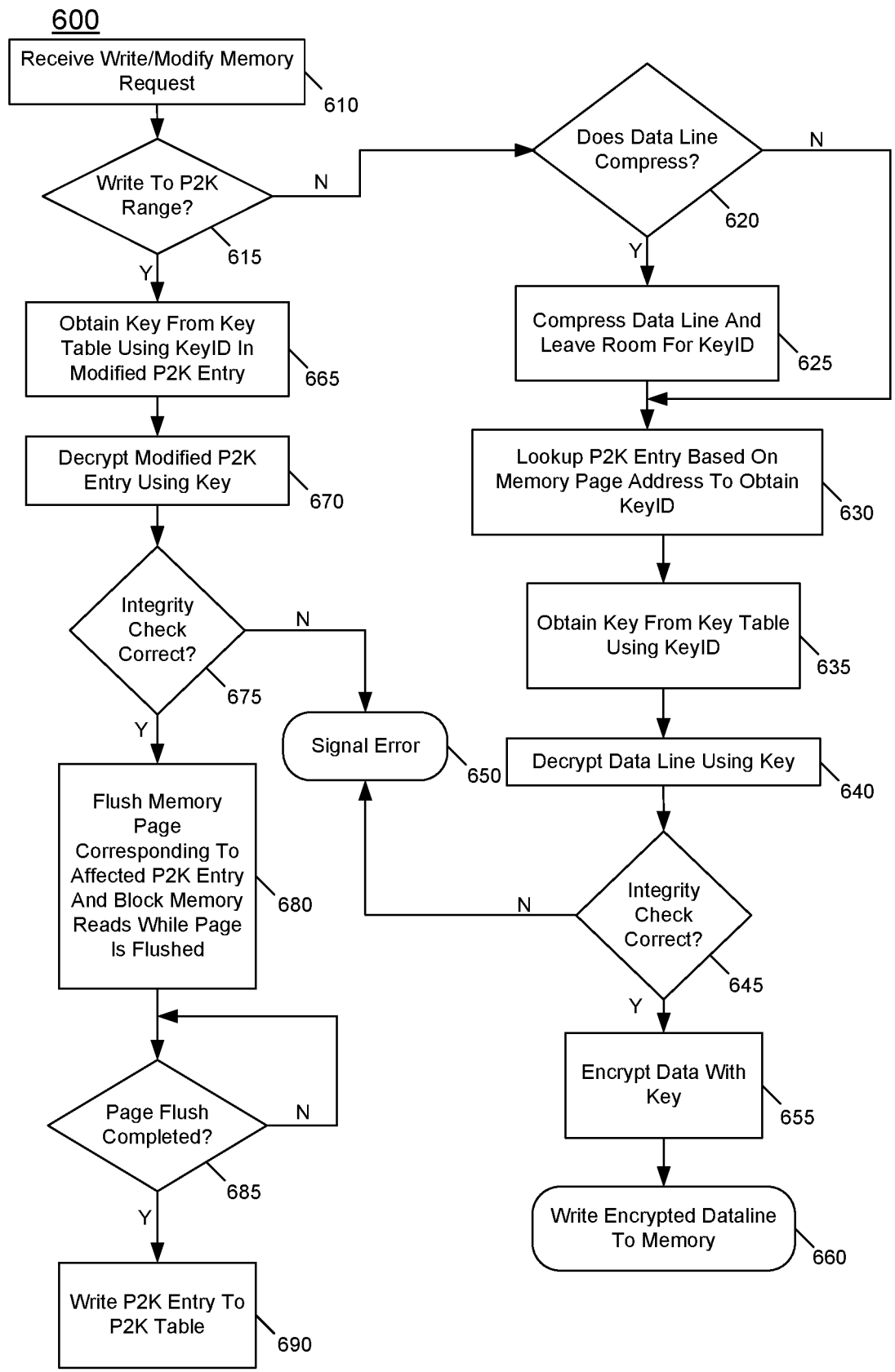
FIG. 6 is a flow diagram of a method in accordance with another embodiment of the present invention.

Referring now to FIG. 6, shown is a flow diagram of a method in accordance with another embodiment of the present invention. More specifically, method 600 shown in FIG. 6 is a method for handling a write/modify memory request for an encrypted memory as described herein. In embodiments, method 600 may be performed by a memory execution circuit such as a memory encryption engine of a secure computing domain. As such, method 600 may be performed by hardware circuitry, software, firmware and/or combinations thereof.

As illustrated in FIG. 6, method 600 begins by receiving a write/modify memory request, e.g., in the memory execution circuit from a given requester such as a VM or other agent (block 610). Control passes from block 610 to diamond 615 to determine whether this write is to a location within the P2K table itself. If not, control passes to diamond 620 to determine whether the received data line is to be compressed. In one embodiment, this determination may be based on whether there is sufficient repetition in the data line to allow for compression. In another embodiment, this determination may be made based on a compression indicator of the incoming data line, for example, where compression was already performed by another entity. As one example, this may occur on a write to memory where another hardware block already compressed the line, and set the indicator to indicate to the memory execution circuit that the line was already compressed. If the data line is to be compressed, control passes to block 625 where the data line is compressed according to a given compression technique. By way of this compression, additional space is made available within the data line to enable storage of the KID (in uncompressed and unencrypted form) to enable more efficient lookups for read operations.

Still with reference to FIG. 6, control next passes to block 630 where a lookup to the P2K table occurs based on the memory page address to obtain the KID. In some cases instead of this P2K table access, this KID may be cached. In any event, control next passes to block 635 where the key table is looked up using this KID to obtain the key. Thereafter at block 640 the key is used to decrypt the P2K entry itself. Control next passes to diamond 645 to determine whether an integrity check is correct. In an embodiment, this integrity check may be a comparison of the page address as received in the write request as compared to the page address present in the P2K entry. If an error is identified, e.g., due to a mismatch, control passes to block 650 where this error is signaled. Otherwise, control passes to block 655 where the data may be encrypted with the key. Thereafter the data line, which includes this encrypted data (and possibly the KID itself (unencrypted and uncompressed) in the case of compressed data), is sent to memory (block 660) for storage.

Still with reference to FIG. 6, in the case of a write to the P2K table itself, control passes from diamond 615 to block 665 where a key is obtained from the key table using the KID present in the modified P2K entry (namely the entry to be written to the P2K table). Thereafter, control passes to block 670 where this modified P2K entry is decrypted using the obtained key. At diamond 675, it is determined whether an integrity check is correct. This integrity check operates to compare the page address of the received memory write request with the page address stored in the modified P2K entry. And if a mismatch is detected, control passes to block 650 to signal an error. Otherwise, control passes to block 680 where a cache flush may occur. More specifically, the memory page corresponding to this affected P2K entry may be flushed from a cache hierarchy of the processor to ensure that there are no integrity issues when this new entry (with a new key) is written to the table. Note that during this time while the page is flushed to memory, memory reads to the page may be blocked. It is next determined at diamond 685 whether the page flush has completed. When it has, control passes to block 690 where this encrypted P2K entry is written to the P2K table in memory. Understand while shown at this high level in the embodiment of FIG. 6, many variations and alternatives are possible.

Note that when a key-to-KeyID mapping is changed, all the processor caches (at least for the KeyID) are flushed, so no decrypted data exists for the previous key. Then the new KeyID-to-key mapping can be established. P2K entries using the wrong key do not decrypt properly and will be detected when integrity is checked (e.g., improperly decrypted P2K entries will be corrupted, address field does not match, reserved fields are not zero). When new entries are written to the P2K table, they are already encrypted with the new key. If they are encrypted with the old (or wrong) key, they will not decrypt properly and an integrity check fails.

Figure 7:
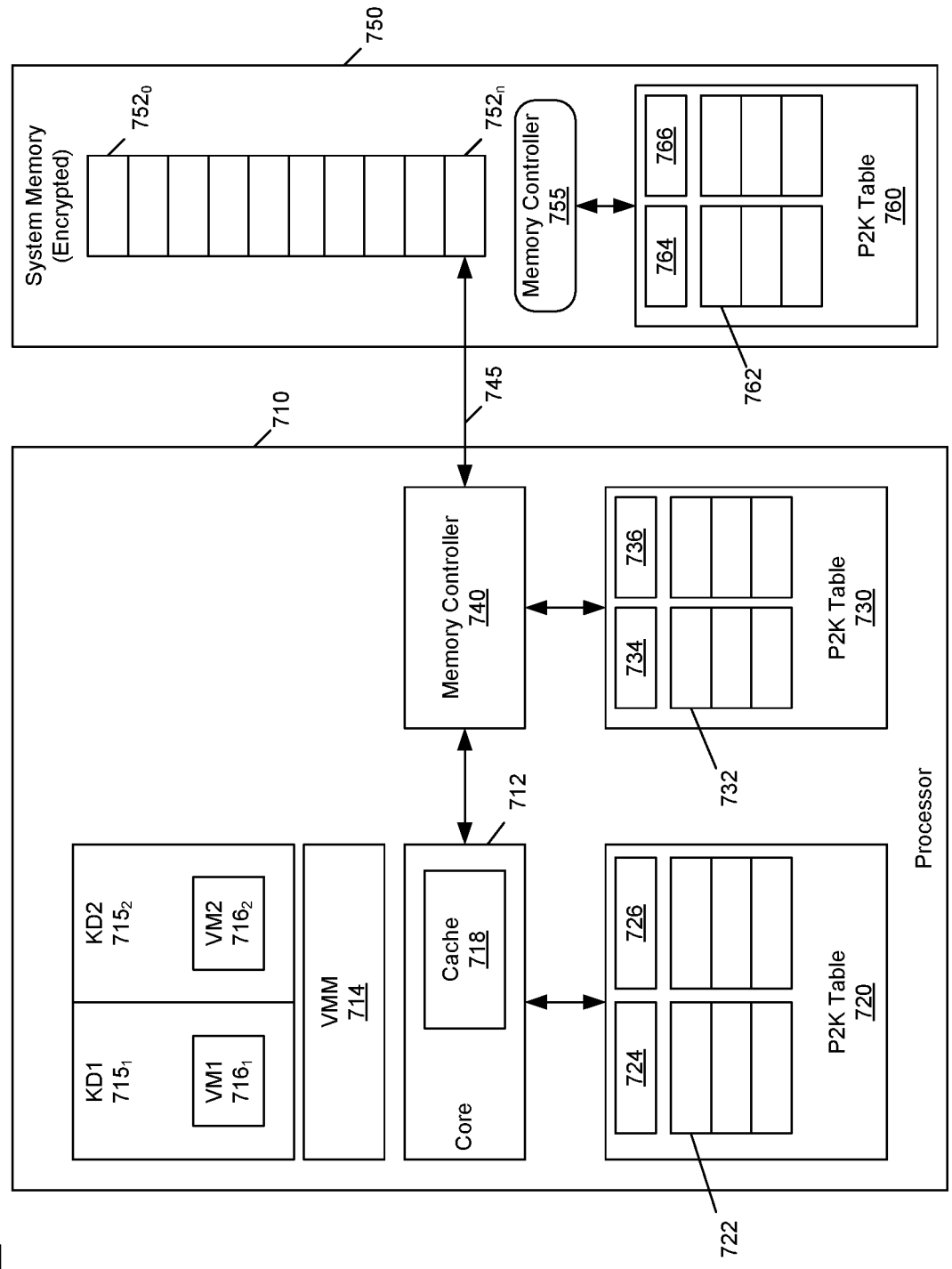
FIG. 7 is a block diagram of portion of a multi-tenant computing environment in accordance with various embodiments.

As briefly discussed above, a P2K table can be implemented in different locations in various embodiments. As particular examples, the P2K table can be implemented in a core, memory controller or on the memory itself. Referring now to FIG. 7, shown is a block diagram of portion of a multi-tenant computing environment showing possible P2K table implementations in accordance with various embodiments. Specifically, computing environment 700 includes, at least a processor 710 and a system memory 750 to which processor 710 is coupled by a given memory interconnect 745. In the context of FIG. 7, assume that processor 710 is a multicore processor or other such SoC. For purposes of illustration herein, shown is a single core 712. Of course a given implementation may include more than one such core. Core 712 couples to a memory controller 740 that acts as a primary interface and controller for memory 750. Of course memory 750, which in the embodiment shown may be implemented as a plurality of DIMMs $752_0$-$752_n$, may be internally controlled by an internal memory controller 755 such a given DIMM controller.

With this high level arrangement, various alternative locations for a P2K table are described. Of course in a particular implementation, it is likely that only a single one of these options will be adopted, such that there is only a single instantiation of a P2K table. However, understand that while a single complete instantiation of a P2K table may exist in a system, at least portions of the entries of this table may be cached in one or more locations to provide for reduced latency. As described above, in particular implementations, at least some entries of the P2K table may be cached, e.g., within a cache memory hierarchy 718 of processor 710.

With continued reference to FIG. 7, high level details of multi-tenant computing environment 700 are illustrated. Specifically, in a virtualization environment, a VMM 714 may act as a primary hypervisor layer to control guest access to underlying hardware (including core 712, memory controller 740, in turn providing access to system memory 750) and so forth. As further illustrated, multiple independent key domains $715_1$, $715_2$ may execute under VMM 714. In an embodiment, each key domain 715 may be associated with a given tenant of the multi-tenant computing environment 700. Of course while only two independent key domains are shown, many more may be present in a particular implementation. And as described herein, understand that each key domain 715 may be isolated from each other. Furthermore, with the multi-key encryption techniques described herein, information encrypted by a given key domain 715 also may be isolated from VMM 714 and other cloud-based software.

As illustrated, at least one virtual machine $716_1$, $716_2$ may be associated with each key domain 715. In embodiments, such virtual machines may include or may be associated with a guest agent to perform key generation and mapping of the generated keys to corresponding pages of memory 750 allocated to a given VM to provide isolation.

As a first option, a P2K table 720 may be adapted on a core-side of processor 710. As illustrated, P2K table 720 may include a plurality of entries 722, each of which may include a physical address 724 and a corresponding KeyID 726. Different possible implementations here are possible. In one embodiment, the physical address information stored within P2K table 720 may be implemented using host physical addresses (HPAs). In a different embodiment, these physical addresses may be implemented using guest physical addresses (GPAs). In embodiments in which P2K table 720 is implemented on a core side of a processor, TLBs and an inter-socket to interconnect may communicate additional bits of KeyID information. In addition, a PMH may add/append these KeyID to a physical address. In this case, a PMH may be configured to use these KeyIDs based on HPA or GPA. In the latter case, the HPA lookup and KeyID lookup may be performed in parallel. In an embodiment, there may be an additional context register for the GPA case.

As another option, a different implementation may position a P2K table associated with memory controller 740. Thus as further illustrated in FIG. 7, in such implementation P2K table 730 may couple directly to memory controller 740. As with P2K table 720, P2K table 730 may include a plurality of entries 732, each including a physical address 734 and a corresponding KeyID 736. Note that in this uncore or memory controller-based implementation, the TLBs/PMH may not be expanded with more bits.

In yet other embodiments, the P2K table may be implemented completely within the system memory. Thus as further illustrated in FIG. 7, as another option a P2K table 760 may couple directly to memory controller 755 within system memory 750. P2K table 760 includes multiple entries 762, each including a physical address 764 and a corresponding KeyID 766. In this implementation, note that the physical addresses may be implemented as server level physical addresses (namely SPAs) so that appropriate socket information for a multi-socket computing environment can be used in allocating key identifiers to pages. In such embodiments, this table location would also not expand TLBs/interconnects.

Figure 8:
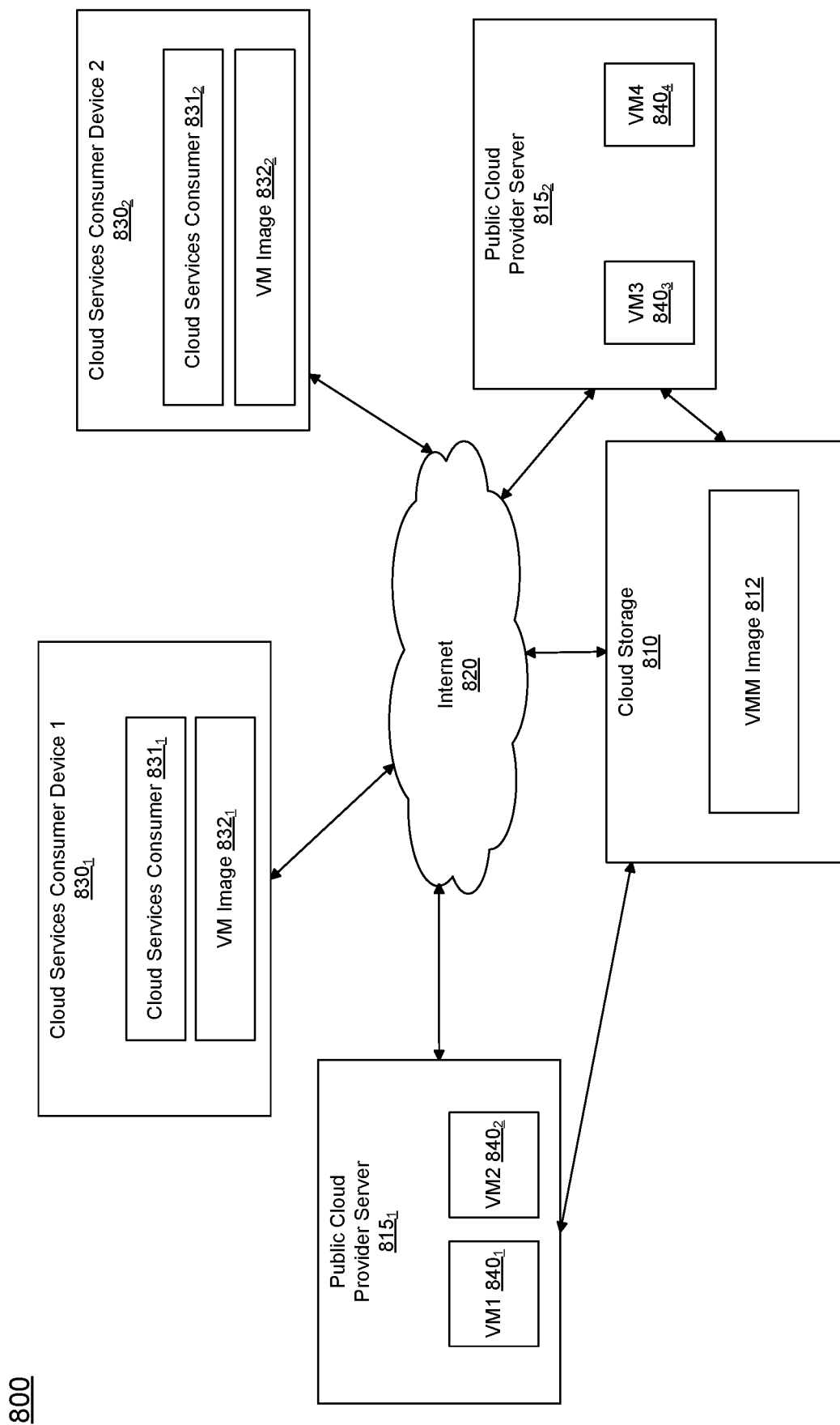
FIG. 8 is a block diagram of a cloud services environment in accordance with an embodiment of the present invention.

Referring now to FIG. 8, shown is a block diagram of a cloud services environment in accordance with an embodiment of the present invention. As shown in FIG. 8, network 800 can be used to allow consumers to request services, including virtualization services, from a public cloud services provider. As seen, network 800 can correspond to any type of communications network and can include many different types of computing devices interconnected via a given network such as Internet 820.

Cloud storage 810 can be provided as part of a data center that includes various computing devices, storage devices and so forth. As one example, cloud storage 810 can be a storage device that includes multiple storage components such as disks, optical, or semiconductor-based storage. Cloud storage 810 can act, for example, as a repository of master copies of various applications, including a VMM application that instantiates virtual machines to provide services in response to a consumer's request. In the embodiment shown in FIG. 8, a master copy of a VMM application is stored in the form of VMM image 812. VMM image 812 is a software image containing a software stack designed to provide a virtual machine platform in the form of a VMM.

Thus as further seen in FIG. 8, at the same location, e.g., as part of the same data center, one or more public cloud services provider servers, such as public cloud provider servers $815_1$ and $815_2$ can be coupled to cloud storage 810. In various embodiments, public cloud services provider servers can be used to service consumer services requests, including virtualization requests. For example, each public cloud services provider server may host one or more virtual machines on behalf of a consumer. In the example shown in FIG. 8, public cloud provider server $815_1$ hosts two virtual machines, VM1 $840_1$ and VM2 $840_2$. Similarly, public cloud provider server $815_2$ hosts two virtual machines, VM1 $840_3$ and VM2 $840_4$. Public cloud provider servers 815 may maintain P2K tables and key tables as described herein.

As shown in FIG. 8, various consumer devices can be present, e.g., cloud services consumer devices $830_1$ and $830_2$. Such cloud services consumer devices may be personal devices of a given user such as a smartphone, tablet computer, desktop computer or so forth. Alternatively, cloud services consumer devices may be servers for an organization that consumes cloud services. In addition, cloud services consumer devices may be emulated via software.

Each of cloud services consumer devices $830_1$ and $830_2$ provides a respective cloud services consumer $831_1$ and $831_2$ and a respective VM image $832_1$ and $832_2$. Cloud services consumers $831_1$ and $831_2$ may be, for example, a client component of a cloud services application used to request cloud services. VM images $832_1$ and $832_2$ may be stored in storage (not shown) coupled to the respective cloud services consumer devices $830_1$ and $830_2$. These VM images are provided by the consumer to the cloud services provider and used to create a secure VM, such as VM1 $840_1$, running on the cloud provider's server $815_1$.

When a secure VM has been established on the cloud services provider's server in accordance with the techniques described herein, the consumer may then use that VM, with the consumer's secret keys, to create additional VMs on behalf of the consumer. Thus, once one consumer VM can be securely established in the cloud services provider's cloud, that VM can then perform all the operations of the consumer devices in FIG. 8, including creating additional secure VMs. Likewise, a consumer can establish secure VMs with multiple cloud services providers and these secure VMs can interact securely via secure communications channels using the consumer's secret keys.

FIG. 9 is a diagram showing an apparatus in accordance with one embodiment of the invention, which may be an apparatus 900 to secure a public cloud environment according to an embodiment. Apparatus 900 may include any computing device and/or data platform such as a laptop, personal digital assistant (PDA), media content player, imaging device, mobile Internet device (MID), any smart device such as a wireless smart phone, smart tablet, smart TV, computer server, and so on, or combinations thereof.

Apparatus 900 includes a memory 912. Memory 912 may be external to a processor 911 (e.g., external memory), and/or may be coupled to processor 911 by, for example, a memory bus. In addition, memory 912 may be implemented as main memory. Memory 912 may include, for example, volatile memory such as DRAM, non-volatile memory, and so on, or combinations thereof.

Memory 912 may be protected using encryption and integrity checking. In one embodiment, an encryption technique called a tweakable block cipher is used. A tweakable block cipher accepts a second input, called a tweak, along with plaintext or ciphertext input to be encrypted. The tweak, along with the key, selects the permutation computed by the cipher. For example, a tweak function may use a physical memory address as a tweak to a block cipher to bind unencrypted data with the physical memory address. A tweak function 945 may include, for example, XTS (XOR-encrypt-XOR)/XEX-based tweaked codebook mode with ciphertext stealing) algorithm, Liskov, Rivest, and Wagner (LRW) algorithm, and so on, or combinations thereof.

Processor 911 may include any type of processor such as, for example, micro-processor, an embedded processor, a digital signal processor (DSP), a central processing unit (CPU), a graphical processing unit (GPU), a visual processing unit (VPU), a network processor, a device to execute code to implement the technologies described herein, and so on, or combinations thereof. Processor 911 may include one or more cores such as, for example, a core 916 and a core 918. Cores 916, 918 may include a single-threaded core, a multithreaded core including more than one hardware thread context (or "logical processor") per core, and so on, or combinations thereof. Cores 916, 918 may include an instruction decoder to recognize and/or decode an instruction (e.g., from an instruction register), to activate appropriate circuitry to execute the instruction, to verify that a stream of instructions (e.g., operation codes, etc.) will compute, and so on, or combinations thereof.

Processor 911 may include internal storage such as, for example, a processor cache 913 including one or more levels to store data (e.g., instructions, operands, program data, etc.) utilized by one or more components of processor 911. Cache 913 may not be encrypted and/or may share a same die as processor 911, on the same chip. In addition, the processor cache may be integrated onto one or more of cores 916, 918. Processor 911 includes a cache 913. Cache 913 may include any type of cache such as, for example, an instruction cache, a data cache, a single level cache, a multi-level cache, a shared cache, a strictly inclusive cache, an exclusive cache, and so on, or combinations thereof. For example, the cache 913 may include a mid-level cache, such as level 2 (L2), level 3 (L3), level 4 (L4), or other levels of cache, a last level cache (LLC), and so on, or combinations thereof. Cores 916, 918 may check whether data is located in cache 913 to execute one or more instructions and/or other data (e.g., program data, etc.), wherein a cache miss may cause a transfer of the data from memory 912 to cache 913 in a block of fixed size (e.g., cache line).

Each core 916, 918 may be, for example, coupled with respective memory via a respective memory controller such as a memory controller 917, coupled with shared memory via a shared memory controller, coupled with respective memory via a shared memory controller, and so on, or combinations thereof. In addition, a shared cache may be coupled with a shared memory controller, a plurality of caches may be coupled with a plurality of respective memory controllers, and so on, and combinations thereof. For example, memory controller 917 may be shared among cores 916, 918, may be coupled with cache 913 (e.g., shared multilevel cache), and may couple cores 916, 918 with memory 912 (e.g., shared DRAM). The memory controller 917 may be coupled with memory 912 (e.g., external memory, DRAM, etc.).

Processor 911 also includes a memory encryption engine 915. The illustrated memory encryption engine 915 includes an encryptor 941, which may encrypt unencrypted data. The unencrypted data may include, for example, cleartext data, plaintext data, and so on, or combinations thereof.

Encryptor 941 may include any type of cipher to generate ciphertext data such as, for example, a block cipher in any desired mode of operation. The block cipher may include a fixed block size, wherein the block cipher may be repeatedly implemented to encrypt data larger than the block size. For example, the block cipher may include Advanced Encryption Standard (AES) in a propagating cipher-block chaining (PCBC) mode of operation. In addition, the block cipher may include an expandable block size.

In one example, the block cipher is Threefish, which may be implemented to obtain an expandable block size of any length (e.g., 256 bits, 512 bits, 1024 bits, etc.). For example, Threefish may utilize a tweak (e.g., 128 bits), which may include a memory address and/or location, and a key which may be the same width as the block. Threefish may utilize a number of rounds (e.g., 72) to encrypt for blocks of 256 bits and 1024 bits, a number of rounds (e.g., 80) for blocks of 1024 bits, and so on. Threefish may utilize a function MIX including an addition operation, a rotation operation by a constant, and an exclusive-or (XOR) operation. Words may be permutated, for example, after each set of MIX functions (e.g., 2, 4, or 8, respectively by block size). A subkey may be injected into the system, for example, every number of rounds (e.g., 4) wherein the subkey may be generated by parts of the key, the tweak, and a counter value. The key and the tweak may be given an extra word at the end (e.g., an XOR of all the other words).

Memory encryption engine 915 also includes a decryptor 942, which may decrypt ciphertext data to generate unencrypted data. Decryptor 942 may include an inverse of encryptor 941. For example decryptor 942 may include an inverse of AES-PCBC. In addition, decryptor 942 may include an inverse of Threefish. For example, the subkeys may be applied in reverse order, with each round including the reverse word permutation followed by the reverse MIX functions. Thus, unencrypted data (e.g., plaintext data) may be implemented as input to encryptor 941 to generate an unreadable copy of the unencrypted data (e.g., ciphertext data) when the unencrypted data is to be stored in memory 912 (e.g., write instruction), wherein decryptor 942 may be implemented to decrypt the ciphertext data and generate the unencrypted data when the ciphertext data is to be fetched from memory 912 (e.g., read instruction).

Memory encryption engine 915 may read an encrypted data line and decryptor 942 may decrypt the encrypted data line, where the decrypted data line identifies the data line physical address, the integrity line index and the integrity line slot selector for the decrypted data line. A comparator (e.g., integrity verifier 944) may identify no match between the integrity line slot value stored and the key domain selector of the data physical memory address for the decrypted data line, and memory encryption engine 915 and/or comparator, responsive to the no match identification, may cause memory encryption engine 915 or a component thereof to flush the cache line, and report the no match condition as one or more of an error or a fault.

Memory encryption engine 915 may also include a compressor/decompressor 947 to compress/decompress the data line bytes as described herein. Memory encryption engine 915 and/or compressor 947 may determine the data line bytes of a particular cache line to be uncompressible, and instead of attempting to embed, e.g., a key identifier into the data line with the data line bytes, may store the key identifier separately (e.g., in a separate location such as another cache line and/or memory location).

Memory encryption engine 915 may further include a key/tweak value selector 948 to select a key from a plurality of keys (e.g., a key domain) and/or a tweak from a plurality of tweaks (e.g., a tweak domain) for a physical location in memory 912. For example, the illustrated memory encryption engine 915 may include a function detector to determine that a function (e.g., a program, middleware, an operating system, firmware, virtual machine, VMM, OS kernel, etc.) or a part of the function (e.g., part of a program, etc.) is being launched for the first time, or is being given access to a physical location in the memory 912 for the first time. Key/tweak value selector 948 may, in response, select a key and/or a tweak (e.g., a key from a key domain, a different key from a same key domain, a different key from a different key domain, a tweak from a tweak domain, a different tweak from a same tweak domain, a different tweak from a different tweak domain, etc.) for the physical location in the memory when the function (and/or part thereof) is given access.

Memory encryption engine 915 also includes logic 949, which may utilize components of processor 911 such as, for example, cores 916, 918, encryptor 941, decryptor 942, etc., to maintain (e.g., ensure, verify, test, etc.) the security and integrity of memory 912. Although not illustrated in FIG. 9, the apparatus 900 may include other elements on chip with the processor 911. For example, processor 911 may include input output (IO) control logic integrated with memory encryption engine 915. Additionally, while examples have shown separate components for illustration purposes, it is should be understood that one or more of the components of apparatus 900 may be combined, may reside in the same and/or different physical and/or virtual locations, and so on, or combinations thereof.

Embodiments thus may be used in a multi-tenant cloud computing environment to secure public cloud facilities using hardware. For example, cloud customers (tenants/consumers) may desire that their workloads be secure in a public cloud infrastructure. The techniques described herein may enable tenants/consumers to be protected from hacking, physical access, administrators, privileged software and the cloud provider itself. Moreover, as discussed herein, an unlimited number of key domains for an unlimited number of tenants/VMs/containers can be provisioned without consumption of additional physical address bits or cached metadata that would expand cache/die area. Additionally, with the cryptographic access control techniques herein, software can directly create data that dictates which memory pages are assigned to which key domain key, removing the need for complex architectural access control mechanisms within a processor.

In addition, embodiments enable cryptographic isolation for CSP customer workloads (tenants/domains), to enable removal of CSP software from a customer's TCB. Note that embodiments can be applied to any DRAM, or SCM-based memory, like NV-DIMM-N. In this way, disk encryption software can work with NVDIMMs in a direct access storage (DAS) mode for SCM. As such, software/applications may take advantage of performance benefits of NVDIMM DAS mode for SCM without compromising platform security requirements, and while meeting security requirements for CSPs.

The following Examples pertain to further embodiments.

In Example 1, an apparatus for encrypting a memory comprises: a cryptographic circuit to encrypt and decrypt data, the cryptographic circuit to receive a data line including at least an encrypted portion from a memory in response to a read request having a memory address from a first agent, obtain a key identifier for a key of the first agent from the data line, obtain the key using the key identifier, decrypt the at least encrypted portion of the data line using the key and send decrypted data of the at least encrypted portion of the data line to a cache hierarchy of a processor for access by the first agent, where the memory is encrypted with a plurality of keys, the key one of the plurality of keys.

In Example 2, the cryptographic circuit is, when the data line is uncompressed, to access a P2K table based at least in part on the memory address to obtain the key identifier from an entry of the P2K table, the P2K table including a plurality of entries each to map a memory page to a key identifier.

In Example 3, the cryptographic circuit is to access a key table using the key identifier to obtain the key, the key table including a plurality of entries each to map a key identifier to a key, where each key is associated with a virtual machine.

In Example 4, the virtual machine is to generate the key and provide an entry for insertion into the P2K table, at least a portion of the entry encrypted with the key.

In Example 5, the apparatus further comprises a memory execution circuit of the processor, the memory execution circuit to receive the entry from the virtual machine and insert the entry into the P2K table.

In Example 6, the memory execution circuit, in response to a second read request from the virtual machine having a second memory address, is to obtain the entry from the P2K table, decrypt the at least portion of the entry with the key, and compare a stored memory address in the decrypted portion of the entry with the second memory address to verify integrity of the entry, and to signal an error if the stored memory address does not match the second memory address.

In Example 7, the apparatus comprises a multi-tenant computing environment on which a plurality of virtual machines are to execute, at least some of the plurality of virtual machines associated with different customers of the multi-tenant computing environment.

In Example 8, the apparatus further comprises a compression circuit to decompress at least a portion of the data line based on compression metadata stored in the data line.

In Example 9, the apparatus comprises: a processor including: a plurality of cores; a cache memory hierarchy; a memory execution circuit; and a memory controller to couple to the memory, where the memory execution circuit comprises the cryptographic circuit and the compression circuit is associated with the cache memory hierarchy and to send the decompressed portion of the data line to the cache memory hierarchy.

In Example 10, a method for encrypting a memory comprises: generating, by a virtual machine, a key for a page of a memory allocated to the virtual machine by a supervisor of a multi-tenant computing environment including at least one processor and the memory; generating, by the virtual machine, an entry for a P2K table stored in the memory, the entry including a key identifier for the key and an address of the page of the memory; and encrypting, by the virtual machine, at least the address of the page of the memory and sending the entry including the key identifier and the encrypted address of the page of memory to the supervisor to cause the supervisor to store the entry in the P2K table, where the key is to be used by a memory execution circuit of the at least one processor to encrypt and decrypt data to be stored in the page of the memory by the virtual machine.

In Example 11, the method further comprises preventing access by entities other than the virtual machine to encrypted data stored in the page of the memory.

In Example 12, the method further comprises: obtaining, in the memory execution circuit, encrypted data from the memory in response to a read request from the virtual machine; obtaining, in the memory execution circuit, a key associated with the virtual machine based on a mapping of a key identifier to the key; and decrypting the encrypted data using the key to obtain unencrypted data and sending the unencrypted data to a cache memory of the at least one processor to enable the virtual machine to access the unencrypted data.

In Example 13, the method further comprises accessing an entry of a key table using the key identifier, the key table having a plurality of entries each including a key identifier and a key.

In Example 14, the method further comprises obtaining the key identifier from a data line obtained from the memory in response to the read request, the data line including the key identifier and the encrypted data.

In Example 16, a multi-tenant computing system for encrypting a memory comprises at least one processor including: a plurality of cores on which a plurality of agents of a plurality of tenants of the multi-tenant computing system are to execute; at least one cache memory coupled to the plurality of cores; and a memory execution circuit to receive data for a first agent of the plurality of agents, encrypt the data with a first key of the first agent and send the encrypted data to a memory to be stored in the memory, the memory execution circuit to obtain the first key based at least in part on a first key identifier associated with the first key and obtain the first key identifier from a page-to-key table stored in the memory. The system may further include the memory coupled to the at least one processor, the memory to store the page-to-key table having a plurality of entries, each of the plurality of entries to map a key identifier to a page of the memory, where at least some of the plurality of agents are to generate at least some of the plurality of entries.

In Example 17, the plurality of entries of the page-to-key table each comprises an unencrypted key identifier and an encrypted address of a page of the memory.

In Example 18, the memory is further to store a key table including a plurality of entries, each of the plurality of entries to map a key identifier to a key, the key generated by one of the plurality of agents.

In Example 19, the memory further comprises a first address space to store a plurality of pages allocated to the first agent, where a first data line of a first page of the first address space comprises the first key identifier and the encrypted data, and data of the encrypted data is further compressed.

In Example 20, in response to a read request for the first data line, the memory execution circuit is to receive the first data line from the memory, obtain the first key using the first key identifier stored in the first data line, decrypt the encrypted data of the first data line using the first key, and send the decrypted data to the at least one processor.

In Example 21, in response to a read request for a second data line, the memory execution circuit is to receive the second data line from the memory, obtain a second key identifier from the page-to-key table based on an address of the second data line, obtain a second key using the second key identifier, decrypt encrypted data of the second data line using the second key, and send the decrypted data to the at least one processor.

In Example 22, an apparatus comprises: means for receiving an encrypted data line from a memory in response to a read request; means for obtaining a key identifier for a key to be used to decrypt the encrypted data line from a P2K table means based at least in part on an address of the read request; means for obtaining the key using the key identifier; means for decrypting the encrypted data line using the key and sending decrypted data of the encrypted data line to a requester, where the memory is encrypted with a plurality of keys associated with a plurality of tenants of a multi-tenant computing environment; and the P2K table means having a plurality of entries each to map a portion of the memory to a key identifier, where each of the plurality of entries is encrypted by one of the plurality of tenants.

In Example 23, the apparatus comprises a processor means and the P2K table means is associated with one or more cores of the processor means, where the plurality of entries each comprises a physical address of a page of the memory and the key identifier, the physical address one of a host physical address and a guest physical address, the P2K table means to be indexed by a page address of the read request.

In Example 24, the apparatus comprises a processor means further comprising a memory control means comprising the P2K table means, where the plurality of entries each comprises a physical address of a page of the memory and the key identifier, the P2K table means to be indexed by a page address of the read request.

In Example 25, the multi-tenant computing environment comprises at least one processor means and the memory coupled to the at least one processor means. In turn, the memory comprises: a plurality of memory modules to store a plurality of encrypted memory pages; and a memory controller comprising the P2K table means, where each of the plurality of entries comprises an encrypted physical address associated with one of the plurality of encrypted memory pages and the key identifier.

In other Examples, a computer-readable storage medium includes computer-readable instructions, when executed, to implement a method as claimed in any one of the above Examples.

In still further Examples an apparatus comprises means to perform a method as claimed in any one of the above Examples.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a cryptographic circuit to encrypt and decrypt data, the cryptographic circuit to:
receive a data line from a memory in response to a read request from an agent, wherein the data line includes at least an encrypted portion, and the read request has a memory address;
obtain a key identifier for a key of the agent from the data line;
use the key identifier to obtain the key;
use the key to decrypt the at least encrypted portion of the data line into decrypted memory data; and
send the decrypted memory data to a cache memory hierarchy of a processor for access by the agent; and
wherein:
the memory is encrypted with a plurality of keys;
the key is one of the plurality of keys;
the cryptographic circuit is to obtain the key identifier from the data line when the data line is compressed; and
when the data line is uncompressed, the cryptographic circuit is to use the memory address of the read request to obtain the key identifier from a page-to-key (P2K) table that comprises a plurality of entries, each to map a particular memory page to a corresponding key identifier.

2. The apparatus of claim 1, wherein each entry of the P2K table comprises (a) an encrypted page address for a page of the memory and (b) a corresponding key identifier.

3. The apparatus of claim 2, wherein the cryptographic circuit is to access a key table using the key identifier to obtain the key, the key table including a plurality of entries each to map a key identifier to a key, wherein each key is associated with a virtual machine.

4. The apparatus of claim 3, wherein the virtual machine is to generate the key and provide an entry for insertion into the P2K table, at least a portion of the entry encrypted with the key.

5. The apparatus of claim 4, further comprising a memory execution circuit of the processor, the memory execution circuit to receive the entry from the virtual machine and insert the entry into the P2K table.

6. The apparatus of claim 5, wherein the memory execution circuit, in response to a second read request from the virtual machine having a second memory address, is to obtain the entry from the P2K table, decrypt the at least portion of the entry with the key, and compare a decrypted version of an encrypted memory address in the entry with the second memory address to verify integrity of the entry, and to signal an error if the decrypted version of the encrypted memory address does not match the second memory address.

7. The apparatus of claim 1, wherein the apparatus comprises a multi-tenant computing environment on which a plurality of virtual machines are to execute, at least some of the plurality of virtual machines associated with different customers of the multi-tenant computing environment.

8. The apparatus of claim 1, further comprising a compression circuit to decompress at least a portion of the data line based on compression metadata stored in the data line.

9. The apparatus of claim 8, wherein the apparatus comprises:
the processor, and the processor comprises:
a plurality of cores;
the cache memory hierarchy;
a memory execution circuit; and
a memory controller to couple to the memory, wherein the memory execution circuit comprises the cryptographic circuit and the compression circuit is associated with the cache memory hierarchy and to send the decompressed portion of the data line to the cache memory hierarchy.

10. At least one non-transitory computer readable storage medium comprising instructions that when executed enable a system to:
generate, by a virtual machine, a key for a page of a memory allocated to the virtual machine by a supervisor of a multi-tenant computing environment including at least one processor and the memory;
generate, by the virtual machine, an entry for a page-to-key (P2K) table stored in the memory, the entry including a key identifier for the key and an address of the page of the memory; and
encrypt, by the virtual machine, at least the address of the page of the memory and send the entry including the key identifier and the encrypted address of the page of memory to the supervisor to cause the supervisor to store the entry in the P2K table, wherein the key is to be used by a memory execution circuit of the at least one processor to encrypt and decrypt data to be stored in the page of the memory by the virtual machine.

11. The at least one non-transitory computer readable storage medium of claim 10, further comprising instructions that when executed enable the system to prevent access by entities other than the virtual machine to encrypted data stored in the page of the memory.

12. The at least one non-transitory computer readable storage medium of claim 10, further comprising instructions that when executed enable the system to:
obtain, in the memory execution circuit, encrypted data from the memory in response to a read request from the virtual machine;
obtain, in the memory execution circuit, a key associated with the virtual machine based on a mapping of a key identifier to the key; and
decrypt the encrypted data using the key to obtain unencrypted data and send the unencrypted data to a cache memory of the at least one processor to enable the virtual machine to access the unencrypted data.

13. The at least one non-transitory computer readable storage medium of claim 12, wherein to obtain the key comprises to access an entry of a key table using the key identifier, the key table having a plurality of entries each including a key identifier and a key.

14. The at least one non-transitory computer readable storage medium of claim 12, further comprising instructions that when executed enable the system to obtain the key identifier from a data line obtained from the memory in response to the read request, the data line including the key identifier and the encrypted data.

15. A multi-tenant computing system comprising:
a memory;
at least one processor coupled to the memory, the at least one processor including:
a plurality of cores on which a plurality of agents of a plurality of tenants of the multi-tenant computing system are to execute;
at least one cache memory coupled to the plurality of cores; and
a memory execution circuit; and
a supervisor to execute on at least one of the cores, the supervisor (a) to receive at least one entry for a page-to-key (P2K) table from at least one of the agents, the received entry to comprise (i) an encrypted address for a page of the memory and (ii) a corresponding key identifier, and (b) to store the received entry in the memory in the P2K table, the stored entry to comprise (i) the encrypted address and (ii) the corresponding key identifier;
wherein the memory execution circuit is to (a) receive data for a first agent of the plurality of agents, (b) obtain a first key identifier from the P2K table, (c) obtain a first key of the first agent based at least in part on the first key identifier, (d) encrypt the data with a first key of the first agent, and (e) send the encrypted data to the memory to be stored in the memory.

16. The multi-tenant computing system of claim 15, wherein the supervisor is to store a plurality of entries in the P2K table, each entry to comprise an encrypted address for a particular page of the memory and an unencrypted key identifier.

17. The multi-tenant computing system of claim 15, wherein the memory is further to store a key table including a plurality of entries, each of the plurality of entries to map a key identifier to a key, the key generated by one of the plurality of agents.

18. The multi-tenant computing system of claim 15, wherein the memory further comprises a first address space to store a plurality of pages allocated to the first agent, wherein a first data line of a first page of the first address space comprises the first key identifier and the encrypted data, wherein data of the encrypted data is further compressed.

19. The multi-tenant computing system of claim 18, wherein, in response to a read request for the first data line, the memory execution circuit is to receive the first data line from the memory, obtain the first key using the first key identifier stored in the first data line, decrypt the encrypted data of the first data line using the first key, and send the decrypted data to the at least one processor.

20. The multi-tenant computing system of claim 18, wherein, in response to a read request for a second data line, the memory execution circuit is to (a) receive the second data line from the memory, (b) obtain a second key identifier from the P2K table based on an address of the second data line, (c) obtain a second key using the second key identifier, (d) decrypt encrypted data of the second data line using the second key, and (e) send the decrypted data to the at least one processor.

* * * * *